United States Patent
Hatano (10) Patent No.: US 6,992,717 B2
(45) Date of Patent: Jan. 31, 2006

(54) IRIS IDENTIFYING APPARATUS

(75) Inventor: Kouichi Hatano, Gunma (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 782 days.

(21) Appl. No.: 09/912,486

(22) Filed: Jul. 26, 2001

(65) Prior Publication Data

US 2002/0033896 A1    Mar. 21, 2002

(30) Foreign Application Priority Data

Sep. 18, 2000 (JP) .............................. 2000-281955

(51) Int. Cl.
*H04N 5/222* (2006.01)
(52) U.S. Cl. ............................. 348/333.03; 348/333.08
(58) Field of Classification Search ................ 382/117, 382/324; 351/206, 207, 208, 209, 210; 348/78, 348/156, 161, 333.03, 333.08; 340/5.82, 340/5.83; 396/18

See application file for complete search history.

(56) References Cited

U.S. PATENT DOCUMENTS

| 4,641,349 | A | * | 2/1987 | Flom et al. ................. 382/117 |
| 5,410,376 | A | * | 4/1995 | Cornsweet et al. ......... 351/210 |
| 5,512,966 | A | * | 4/1996 | Snook ........................ 351/205 |
| 5,694,198 | A | * | 12/1997 | Ueno ........................ 351/208 |
| 5,865,832 | A | * | 2/1999 | Knopp et al. ............... 351/209 |
| 5,956,122 | A | * | 9/1999 | Doster ........................ 351/210 |
| 6,091,450 | A | * | 7/2000 | Hirasawa ............... 348/333.01 |
| 6,333,988 | B1 | * | 12/2001 | Seal et al. ................... 382/117 |
| 6,382,796 | B1 | * | 5/2002 | Ban ............................ 351/212 |
| 6,445,365 | B1 | * | 9/2002 | Taniguchi et al. ............. 345/9 |
| 6,490,365 | B2 | * | 12/2002 | Horiguchi et al. .......... 382/117 |
| 6,526,160 | B1 | * | 2/2003 | Ito ............................. 382/117 |
| 6,753,919 | B1 | * | 6/2004 | Daugman ................... 382/117 |
| 6,907,135 | B2 | * | 6/2005 | Gifford et al. .............. 382/117 |
| 2002/0008768 | A1 | * | 1/2002 | Takada et al. ......... 348/333.03 |
| 2002/0093645 | A1 | * | 7/2002 | Heacock ..................... 356/138 |

FOREIGN PATENT DOCUMENTS

| JP | 10-268372 | 10/1998 |
| JP | 10-341373 | 12/1998 |
| JP | 11-160614 | 6/1999 |
| JP | 2000-207536 | 7/2000 |
| JP | 2000-259817 | 9/2000 |

OTHER PUBLICATIONS

U.S. Appl. No. 09/253,795, filed Feb. 22, 1999.

* cited by examiner

*Primary Examiner*—Thai Tran
*Assistant Examiner*—Jason Whipkey
(74) *Attorney, Agent, or Firm*—Venable LLP; Michael A. Sartori; Catherine M. Voorhees (57) ABSTRACT

An iris identifying apparatus includes an optical-axis aligning section which aligns the line of sight of a target person to be picked up, who views a guide light through a view window, with the optical axis of an image pickup device that picks up the eye of the target person. The optical-axis aligning section flickers the guide light and guides the line of sight of the target person to the guide light, and turns on the guide light when the image picked up by the image pickup device comes into focus, thereby notifying the target person of the eye having entered the image pickup distance.

4 Claims, 6 Drawing Sheets

IRIS IDENTIFYING APPARATUS

BACKGROUND OF THE INVENTION

1. Field of the Invention

The present invention relates to an iris identifying apparatus which identifies an individual by extracting the image of an iris from the picked-up image of an eye of the individual.

2. Description of the Related Art

As an iris identifying apparatus which identifies an individual by extracting the image of an iris from the picked-up image of an eye of the individual, there is a so-called handheld type iris identifying apparatus which a target person to be picked up (hereinafter simply called "target person") holds by a hand to pick up the image of an eye of that person.

The handheld type iris identifying apparatus has an infrared-sensitive image pickup unit located at the back of a cold mirror which passes infrared rays and an infrared illumination laid around the cold mirror.

There are a few guide lights over the cold mirror. The guide lights are on initially, and are all turned off when the image to be picked up comes into focus with the image pickup device inside the image pickup unit.

The target person turns his eyes on the guide lights first, and adjusts the distance between an eye and the iris identifying apparatus in such a way that the guide lights are all turned off. When the guide lights are all turned off, the target person keeps the iris identifying apparatus at the position. Then, the target person turns his eyes on the cold mirror and iris identifying apparatus picks up the image of the eye while viewing the image of the eye shown on the cold mirror.

A target person holds the handheld type iris identifying apparatus and turns his eyes on the guide lights, then adjusts the distance between an eye and the iris identifying apparatus in such a way that the guide lights are all turned off, and directs the line of sight to the cold mirror to pick up the image of the eye after confirming that all the guide lights have been turned off. It is difficult for a user, particularly, a novice to stably hold the position of the image pickup unit during image pickup.

SUMMARY OF THE INVENTION

Accordingly, it is an object of the present invention to provide an iris identifying apparatus which is easy to handle for, particularly, a beginner.

To achieve the object, an iris identifying apparatus of the invention comprises a view window into which a target person to be picked up looks; an infrared illumination having a peak wavelength in a range of infrared rays; an image pickup device which has a sensitivity in the range of infrared rays and picks up the image of the eye of the target person through the view window; a guide light which has a peak wavelength in a range of visible rays and guides a line of sight of the target person through the view window; and optical-axis aligning means for aligning the line of sight of the target person viewing the guide light with a photographing optical axis of the image pickup device.

DETAILED DESCRIPTION OF THE PREFERRED EMBODIMENTS

Preferred embodiments of the present invention will be described below with reference to the accompanying drawings. Like or same reference symbols are given to those elements common to the individual drawings.

First Embodiment

Figure 1:
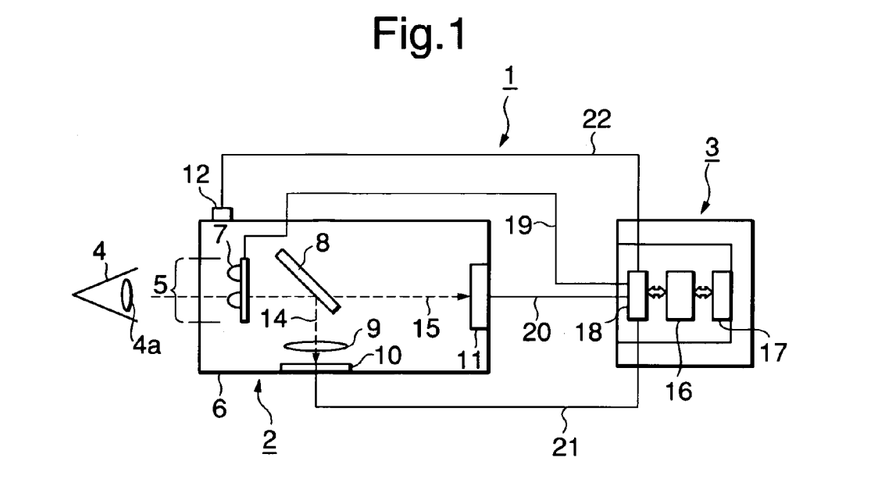
FIG. 1 is a block diagram of an iris identifying apparatus according to a first embodiment of the invention.
Figure 2:
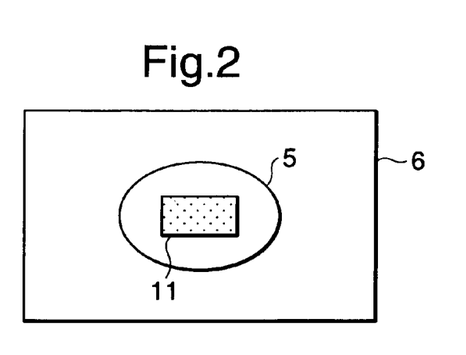
FIG. 2 is a front view of an image pickup unit.
Figure 3:
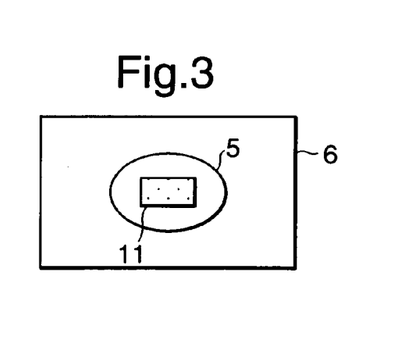
FIG. 3 is an explanatory diagram showing a flickering pattern of guide lights.
Figure 4:
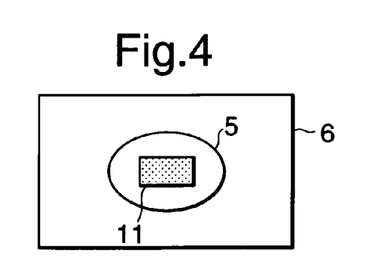
FIG. 4 is an explanatory diagram showing a light-ON pattern of guide lights.
Figure 5:
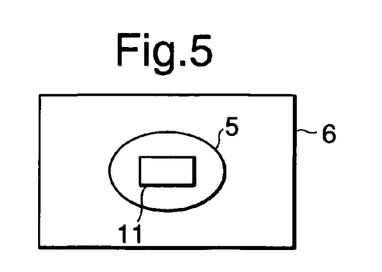
FIG. 5 is an explanatory diagram showing a light-OFF pattern of guide lights.

FIG. 1 is a block diagram of an iris identifying apparatus 1 according to the first embodiment of the invention, FIG. 2 is a front view of an image pickup unit, FIG. 3 is an explanatory diagram showing the flickering of guide lights, FIG. 4 is an explanatory diagram showing the light-ON state of guide lights, and FIG. 5 is an explanatory diagram showing the light-OFF state of guide lights. The iris identifying apparatus 1, which is of a handheld type, comprises an image pickup unit 2 and an identifying unit 3. A target person who undergoes image sensing holds the image pickup unit 2 by one hand and looks into it in one eye.

The image pickup unit 2 has a view window 5 formed in one end face of a case 6, which houses an infrared illumination 7, a hot mirror 8, a lens 9, an image pickup device 10 and guide lights 11 and has an operation switch 12 provided on the top surface. The view window 5 has a size (about $\phi$30 mm) large enough for one eye 4 of the target person to look into.

The infrared illumination 7 is an LED (Light-Emitting Diode) having a peak wavelength in the range of infrared rays. The infrared illumination 7 is placed in such a manner that an optical axis 14 (hereinafter referred to as "photographing optical axis 14") when the eye 4 of the target person is photographed by the lens 9 and the image pickup device 10 having a sensitivity in the range of infrared rays, such as CCD (Charge Coupled Device), crosses the optical axis of the LED at the optimal image pickup distance (that the brightest illumination is given when the eye of the target person lies in the optimal image pickup distance).

The lens 9 is arranged in such a way as to provide the optimal image pickup distance when the image pickup distance between the eye 4 of the target person and the image pickup device 10 is, for example, about 150 mm.

The hot mirror 8, which serves as optical-axis aligning means, reflects infrared rays and passes visible rays. The hot mirror 8 is disposed in such a way that the line of sight, 15, of the target person seeing the guide lights 11 coincides with the photographing optical axis 14.

The guide lights 11 are LEDs having a peak wavelength in the range of visible rays. The guide lights 11 are located at such a position that the guide lights 11 are seen near the center of the view window 5 as shown in FIG. 2 when the target person looks into the apparatus through the view window 5. The guide lights 11 are turned on when an image to be picked up (hereinafter referred to as "target image") is in focus with the image pickup device 10.

The guide lights 11 flicker as shown in FIG. 3 when the target image is not in focus, are turned on as shown in FIG. 4 when the target image is in focus, and are turned off as shown in FIG. 5 when the image pickup is finished.

The identifying unit 3 has a central processing unit 16 (hereinafter referred to as "CPU 16"), memory 17 and input/output port 18. The CPU 16 is connected to the infrared illumination 7 and the guide lights 11 via the input/output port 18 by control cables 19 and 20, respectively. The CPU 16 is connected to the image pickup device 10 via the input/output port 18 by a video cable 21.

The CPU 16 is connected to the switch 12 via the input/output port 18 by a line 22.

The CPU 16 receives the image of the eye 4 of the target person picked up by the image pickup device 10 and computes an image-pickup focus value. The focus value is 0 when no image pickup is taking place and is 100 when the target image is in focus, i.e., when the image pickup distance between the eye 4 of the target person and the image pickup device 10 is the optimal image pickup distance (150 mm).

The focus value is acquired by computing contrast values between each pixel in a specific area of electric image data converted by the image pickup device 10 and its adjoining pixels around the former pixel based on the luminous signals of the individual pixels extracted by an image processing section. That is, the focus value is acquired based on the fact that the closer to the optimal image pickup distance the image pickup distance between the eye 4 of the target person and the image pickup device 10 approaches, the greater the contrast value becomes.

The CPU 16 turns on the guide lights 11 when the focus value is equal to or greater than a predetermined threshold value (e.g., the focus value that is obtained when the image pickup distance lies between 140 mm and 160 mm) and flickers the guide lights 11 when the focus value is smaller than the threshold value. Therefore, the CPU 16 flickers on the guide lights 11 to guide the line of sight of the target person to the guide lights 11 when the target person looks into the view window 5, and turns on the guide lights 11 when the picked up image of the eye 4 enters the image pickup distance with respect to the image pickup device 10, thereby notifying the target person of that event.

Figure 6:
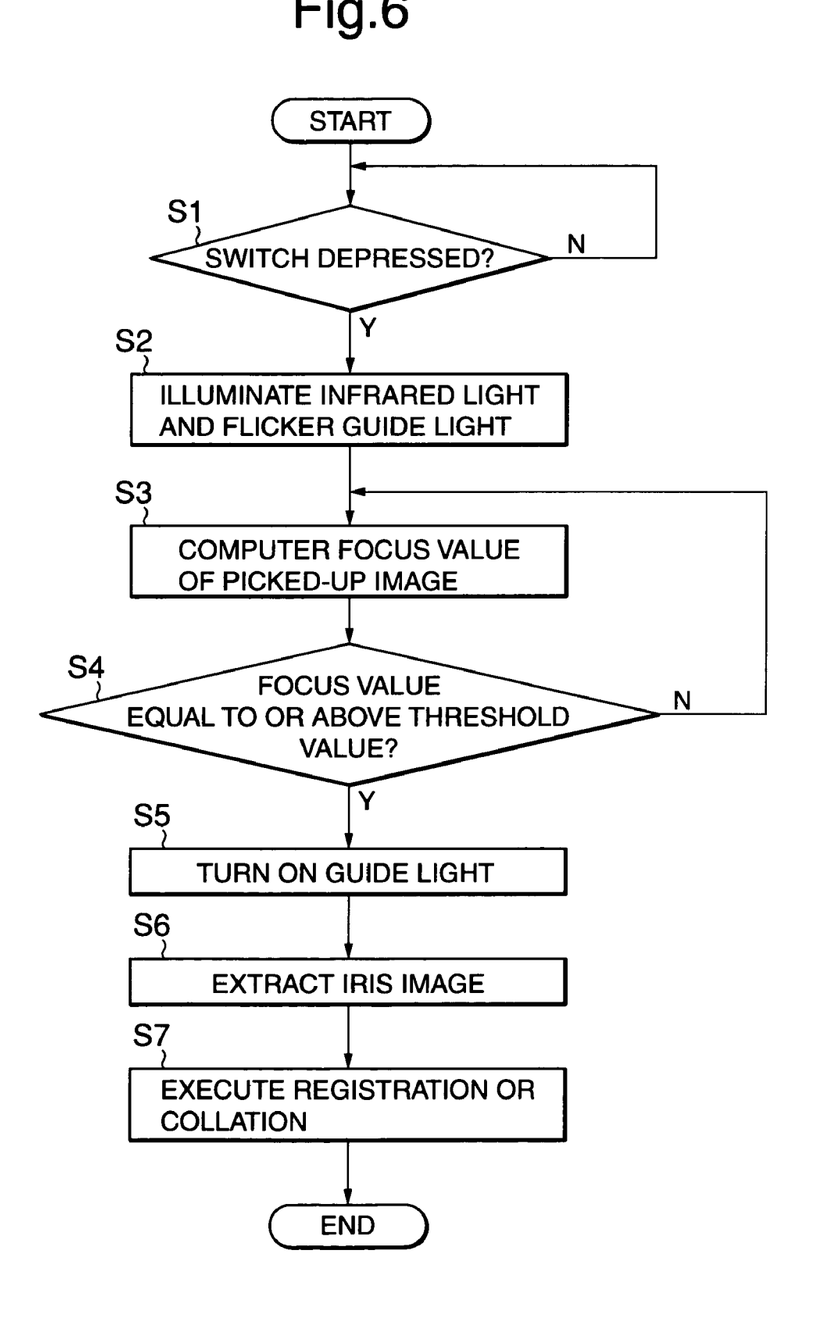
FIG. 6 is a flowchart illustrating the operation of an iris identifying apparatus shown in FIG. 1.

The operation of the iris identifying apparatus will now be described. FIG. 6 is a flowchart illustrating the operation of the iris identifying apparatus shown in FIG. 1. At the time of holding the image pickup unit 2 by a hand and manipulating an iris image, the target person presses the switch 12 and looks into the view window 5 with a predetermined one eye 4.

In step S1, the CPU 16 checks if the switch 12 has been depressed. When the switch 12 has been depressed, the CPU proceeds to step S2. In step S2, the CPU 16 turns on the infrared illumination 7 and flickers the guide lights 11 at the same time.

The infrared rays are reflected at the eye 4 of the target person, are reflected again at the hot mirror 8 and enter the image pickup device 10. The visible rays from the guide lights 11 pass the hot mirror 8 and travel toward the eye of the target person.

In step S3, the CPU 16 receives the image of the eye 4 of the target person picked up by the image pickup device 10 and computes the image-pickup focus value.

In step S4, the CPU 16 checks if the focus value is equal to or greater than the predetermined threshold value. The CPU 16 goes to step S5 when the focus value is equal to or greater than the predetermined threshold value, but returns to step S3 otherwise.

In step S5, the CPU 16 turns on the guide lights 11. The light-ON action of the guide lights 11 notifies the target person of the image of the eye having entered the image pickup distance so that the target person fixes the position of the image pickup unit 2.

The CPU 16 extracts the image of an iris 4a from the picked-up image of the eye 4 in step S6, and performs registration or collation process according to the switch 12 in step S7. At this time, the CPU 16 turns off the guide lights 11, notifying the target person of the end of the image pickup process.

According to the first embodiment, the target person has only to look into the view window and adjust the distance between the eye and the image pickup device after seeing the flickering of the guide lights 11 until the guide lights 11 are turned on. The embodiment can therefore provide an iris identifying apparatus which is easy to operate for any person who undergoes image sensing, particularly, a beginner.

Second Embodiment

Figure 7:
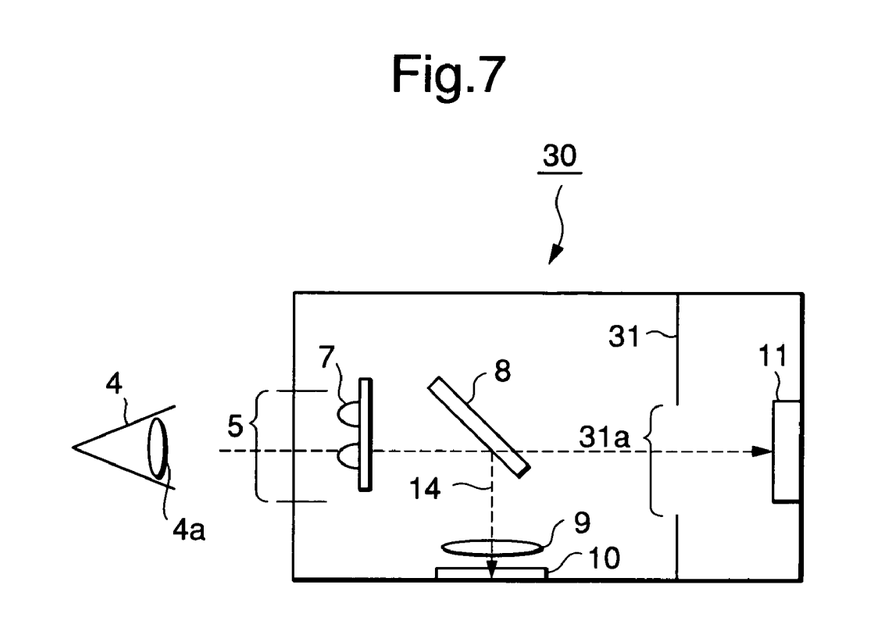
FIG. 7 is a block diagram of an image pickup unit according to a second embodiment of the invention.
Figure 8:
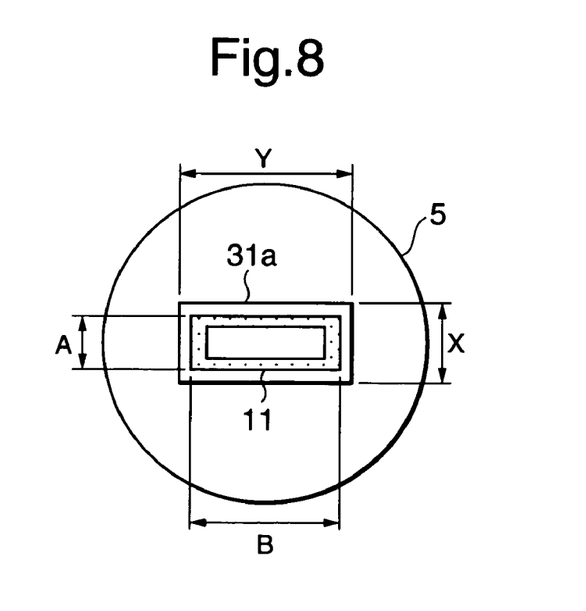
FIG. 8 shows a guide frame and guide lights which are seen through a view window.

FIG. 7 is a block diagram of an image pickup unit according to the second embodiment of the invention, and FIG. 8 shows a guide frame and guide lights which are seen through the view window of the image pickup unit.

The iris identifying apparatus of the second embodiment differs significantly from the iris identifying apparatus of the first embodiment in that an image pickup unit 30 has a guide frame body 31, located between the guide lights 11 and the hot mirror 8, which has a guide frame 31a and guides the center position of the eye 4 of a target person to the center of the image pickup field.

The diameter of the iris 4a is about 11 mm on average, so that when the image pickup device whose picked-up image has a resolution of about 640 pixels×480 pixels is used, the image pickup field becomes 32 mm×24 mm.

Further, the iris identifying apparatus has a capability of detecting the center position of the iris 4a (when the entire image of the iris 4a is not in the image pickup field, the iris 4a is not identified). Because of that capability, the center position of the iris 4a should actually be guided within the range of 12 mm×9 mm with respect to the center of the image pickup field.

Figure 9:
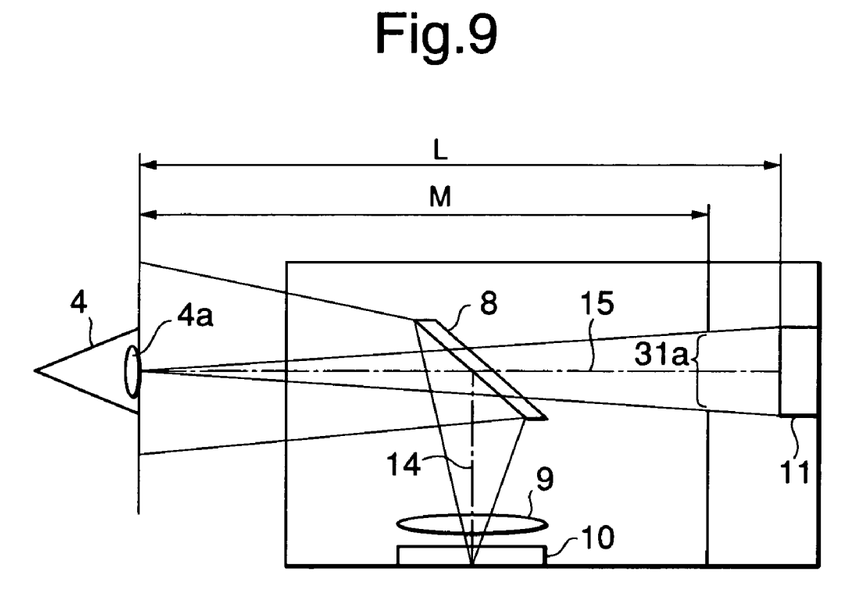
FIG. 9 is an explanatory diagram showing the relationship among an image pickup field, the guide lights and the guide frame.

FIG. 9 is an explanatory diagram showing the relationship among the image pickup field, the guide lights and the guide frame. The size of the guide frame 31a is determined as follows. The horizontal size X and vertical size Y of the guide frame 31a are given by:

$$X = Z \times M/L \quad (1)$$

$$Y = B \times M/L \quad (2)$$

where with the eye 4 of the target person being positioned at the position on the photographing optical axis 14 (passing the center of the image pickup field) where the best iris image can be picked up, L and M are respectively the distance between the eye 4 of the target person and the guide lights 11 and the distance between the eye 4 and the guide frame 31a and, as shown in FIG. 8, A and B are respectively the vertical size and horizontal size of the guide lights 11.

In this situation, the target person sees the guide frame 31a and the guide lights 11 as shown in FIG. 8 through the view window 5. Note that the view window 5 should be set apart from the eye 4 of the target person by 30 to 40 mm.

If the distance (L–M) between the guide lights 11 and the guide frame 31a is too large, the guide frame 31a would look blurred when the eye is in focus with the guide lights 11. If this distance is too short, it is equivalent to the situation where the guide frame 31a is not provided and the guiding precision becomes lower. In this respect, the guide frame 31a is placed at the position that is apart from the guide lights 11 by a certain distance and does not blur the guide frame 31a.

As the target person is previously notified of the entire guide lights 11 completely fitted in the guide frame 31a as shown in FIG. 8, the eye 4 of the target person can be guided into the image pickup field of the image pickup device 10.

Because the operation of the iris identifying apparatus is the same as the operation of the first embodiment, its description will not be repeated.

According to the second embodiment, the provision of the guide frame body between the hot mirror and the guide lights can allows a target person himself or herself to guide one eye of the target person to the position where the best iris image can be picked up.

The iris identifying apparatus is designed in such a way that when the distance between the view window and the eye of the target person is 30 to 40 mm, the target person sees that the entire guide lights completely lie in the guide frame and the best iris image can be picked up. This limits the required operation on the target person side to one directional operation of positioning the eye closer to the image pickup unit, thus resulting in an improved operability.

Third Embodiment

Figure 10:
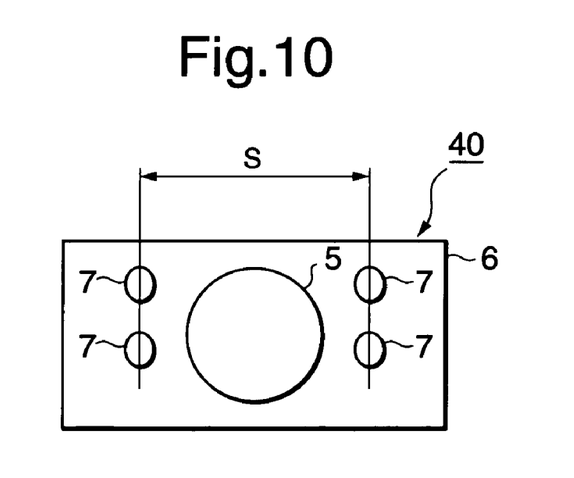
FIG. 10 is a front view of an image pickup unit according to a third embodiment of the invention.
Figure 11:
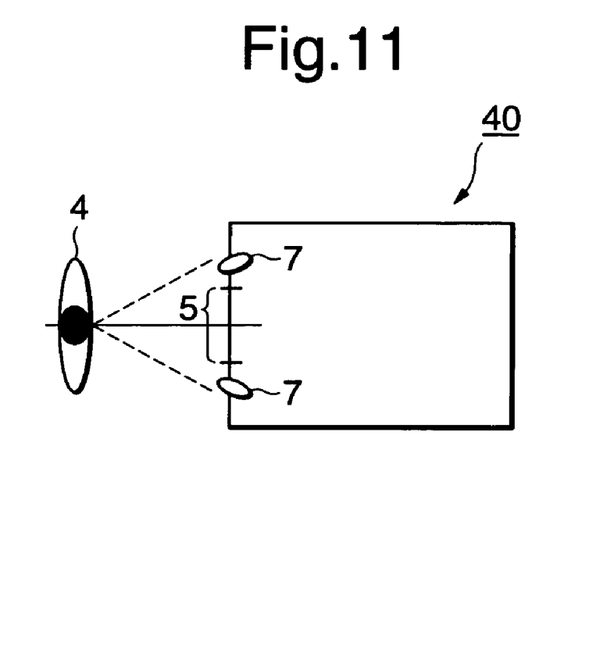
FIG. 11 is a front view of the image pickup unit shown in FIG. 10.

FIG. 10 is a front view of an image pickup unit according to the third embodiment of the invention and FIG. 11 is a front view of the image pickup unit shown in FIG. 10. The iris identifying apparatus of the third embodiment differs from the iris identifying apparatus of the second embodiment in the structure of an image pickup unit 40.

The image pickup unit 40 has infrared illuminations 7 and 7 arranged on the respective sides of the view window 5 at a distance S of about 40 mm between the two so that the infrared rays reflected at one of glasses 41 a target person is wearing are directed out of the image pickup field.

Figure 12:
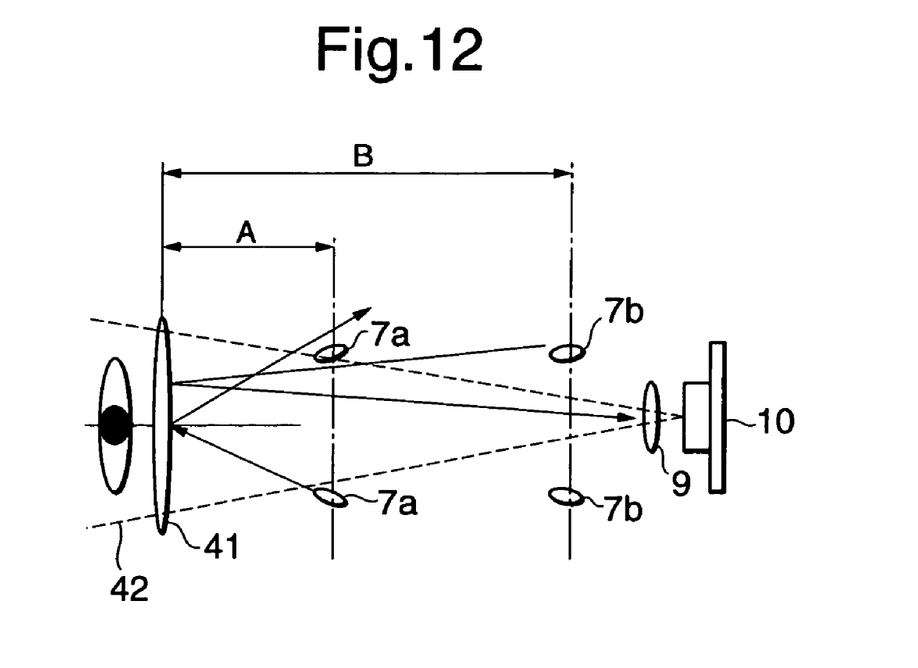
FIG. 12 is an explanatory diagram for explaining glass reflection at the position of infrared illumination.

FIG. 12 is an explanatory diagram for explaining glass reflection at the position of infrared illumination. In FIG. 12, a distance A indicates the case where infrared illuminations 7a and 7a are arranged at the respective sides of the view window 5 at the distance S of about 40 mm set between both illuminations (i.e., where the infrared illuminations are set closer to the eye of the target person) and a distance B indicates the case where infrared illuminations 7b and 7b are arranged in the image pickup unit 40 at the distance S of about 40 mm set between both illuminations (i.e., where the infrared illuminations are set away from the eye of the target person). Broken lines 42 indicate the image pickup field.

When the infrared illuminations are arranged closer to the eye of the target person, the infrared rays reflected at the glass 41 are unlikely to travel toward the image pickup field and hide the iris image. When the infrared illuminations are arranged away from the eye of the target person, however, the infrared rays reflected at the glass 41 are likely to travel toward the image pickup field and the reflected light and screen the iris image.

Because the operation of the iris identifying apparatus is the same as the operation of the second embodiment, its description will be omitted.

According to the third embodiment, as the infrared illuminations are arranged at the respective sides of the view window and close to an eye of a target person at a distance of about 40 mm set between both illuminations, the infrared rays reflected at one of the glasses on the target person are unlikely to travel toward the image pickup field and hide the iris image, so that a good iris image can be acquired.

Fourth Embodiment

Figure 13:
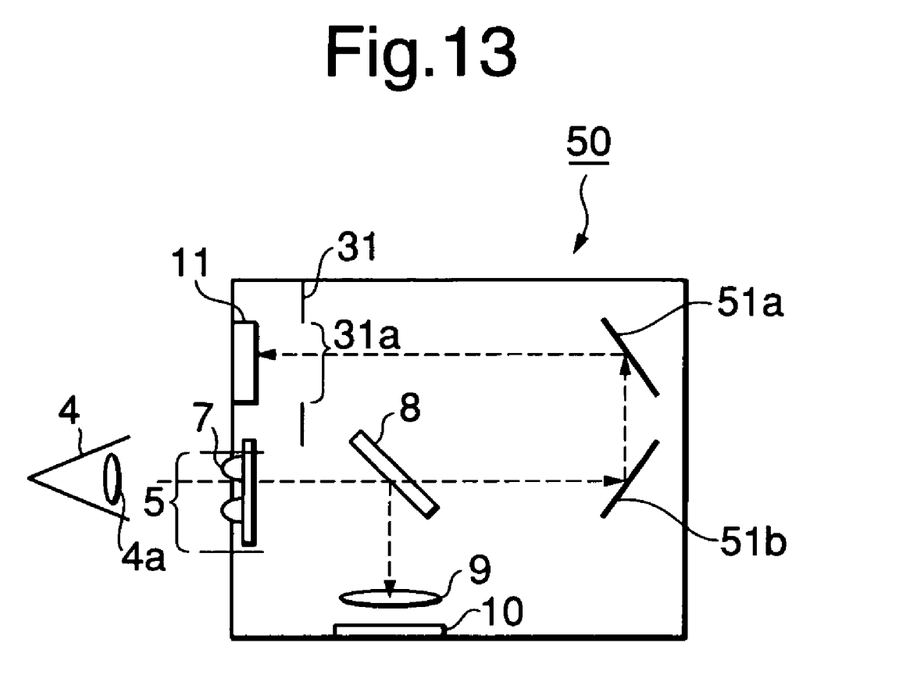
FIG. 13 is a block diagram of an image pickup unit according to a fourth embodiment of the invention.

FIG. 13 is a block diagram of an image pickup unit according to the fourth embodiment of the invention. The iris identifying apparatus of the fourth embodiment differs significantly from the iris identifying apparatus of the third embodiment in that the guide lights 11 are provided above the view window 5, mirrors 51a and 51b are arranged between the hot mirror 8 and the guide lights 11 and the distance between the hot mirror 8 and the guide lights 11 is increased considerably so that the visible rays from the guide lights 11 are reflected at the mirrors 51a and 51b and reach the eye of a target person through the hot mirror 8.

According to the fourth embodiment, the significant increase in the distance between the view window and the guide lights makes the apparent distance longer so that even a farsighted person can clearly see the guide lights.

Further, as the apparent distance is made longer by the combination of reflections of the mirrors, the image pickup unit can be made compact.

Although a hot mirror is used in the first to fourth embodiments, a cold mirror may be used on the condition that the location of the image pickup unit and the location of the guide lights are switched.

Although a handheld type iris identifying apparatus has been illustrated as one example in the foregoing description of the first to fourth embodiments, the invention can be adapted to a fixed type iris identifying apparatus as well.

What is claimed is:

1. An iris identifying apparatus for identifying a target person to be picked up by extracting an image of an iris from a picked-up image of an eye of said target person, comprising:
    a view window into which said target person looks;
    an infrared illumination having a peak wavelength in a range of infrared rays;
    an image pickup device which has a sensitivity in said range of infrared rays and picks up said image of said eye of said target person through said view window;
    a guide light which has peak wavelength in a range of visible rays and guides a line of sight of said target person through said view window;
    optical-axis aligning means for aligning said line of sight of said target person viewing said guide light with a photographing optical axis of said image pickup device; and
    a controller which causes said guide light to change its illumination from flickering ON-OFF to substantially an ON state depending upon a position of said eye of said target person wherein said controller comprises an image-pickup notification means for turning on said guide light and notifying said target person of said eye having entered an image pickup distance of said image pickup device, wherein said image-pickup notification means turns off said guide light when a focus value is 0 indicating a state where said image pickup device is not picking up said image, turns on said guide light when said focus value is equal to or greater than a predetermined threshold value and flickers said guide light when said focus value is smaller than said threshold value, and said focus value of 100 indicates that said image pickup distance is an optimal image pickup distance.

2. An iris identifying apparatus for identifying a target person to be picked up by extracting an image of an iris from a picked-up image of an eye of said target person, comprising:

a view window into which said target person looks;

an infrared illumination having a peak wavelength in a range of infrared rays;

an image pickup device which has a sensitivity in said range of infrared rays and picks up said image of said eye of said target person through said view window;

a guide light which has peak wavelength in a range of visible rays and guides a line of sight of said target person through said view window;

optical-axis aligning means for aligning said line of sight of said target person viewing said guide light with a photographing optical axis of said image pickup device;

image-pickup notification means for turning on said guide light and notifying said target person of said eye having entered an image pickup distance of said image pickup device; and a guide frame, provided between said optical-axis aligning means and said guide light, for guiding said image of said iris within a predetermined range with respect to an image pickup field of said image pickup device.

3. The iris identifying apparatus according to claim 2, wherein said guide frame has a shape which is similar to that of said guide light and hides a part of said guide light when said image of said iris comes off said predetermined range of said image pickup field.

4. An iris identifying apparatus for identifying a target person to be picked up by extracting an image of an iris from a picked-up image of an eye of said target person, comprising:

a view window into which said target person looks;

an infrared illumination having a peak wavelength in a range of infrared rays;

an image pickup device which has a sensitivity in said range of infrared rays and picks up said image of said eye of said target person through said view window;

a guide light which has peak wavelength in a range of visible rays and guides a line of sight of said target person through said view window;

optical-axis aligning means for aligning said line of sight of said target person viewing said guide light with a photographing optical axis of said image pickup device; and a guide frame, provided between said optical-axis aligning means and said guide light, for guiding said image of said iris within a predetermined range with respect to an image pickup field of said image pickup device.

* * * * *